United States Patent [19]
Bohm

[11] Patent Number: 6,033,312
[45] Date of Patent: Mar. 7, 2000

[54] METHOD AND APPARATUS FOR CONTROLLING LATERAL VIBRATION IN A ROTATING SHAFT

[75] Inventor: Robert T. Bohm, Monroe, Conn.

[73] Assignee: Sikorsky Aircraft Corporation, Stratford, Conn.

[21] Appl. No.: 08/728,224

[22] Filed: Oct. 10, 1996

[51] Int. Cl.[7] .................................................. F16C 3/00
[52] U.S. Cl. ......................................... 464/180; 464/179
[58] Field of Search .................................. 464/179, 180; 74/573 R; 267/141, 142

[56] References Cited

U.S. PATENT DOCUMENTS

| | | | |
|---|---|---|---|
| 4,134,309 | 1/1979 | Balke et al. | 74/573 |
| 4,217,766 | 8/1980 | Suckow | 74/574 |
| 4,887,989 | 12/1989 | Kerecman | 464/180 |
| 4,970,424 | 11/1990 | Nakamura et al. | 74/573 R X |
| 5,056,763 | 10/1991 | Hamada et al. | 464/180 X |
| 5,135,204 | 8/1992 | Funahashi | 464/179 X |
| 5,346,432 | 9/1994 | Greulich et al. | 464/180 |
| 5,354,237 | 10/1994 | Amborn et al. | 464/108 |
| 5,593,144 | 1/1997 | Hamada et al. | 464/180 X |

*Primary Examiner*—Lynne H. Browne
*Assistant Examiner*—Greg Binda
*Attorney, Agent, or Firm*—Adam C. Solomon; Terrance J. Radke

[57] ABSTRACT

A method and apparatus for controlling lateral vibration in a rotating shaft, wherein the lateral vibration is controlled through the disposition of a mass having a predetermined weight in combination with the rotating shaft such that the first order critical frequency of the shaft is decreased below an operating frequency range for the rotating shaft. The mass is disposed in combination with the shaft at a second order critical frequency node such that the disposition of the mass does not decrease the second order critical frequency.

12 Claims, 10 Drawing Sheets

METHOD AND APPARATUS FOR CONTROLLING LATERAL VIBRATION IN A ROTATING SHAFT

TECHNICAL FIELD

This invention relates generally to apparatus and methods for controlling lateral vibration in a rotating shaft, and more particularly, to an apparatus and method for controlling lateral vibration in a rotating shaft using a predetermined mass disposed at a second order critical frequency node.

BACKGROUND ART

The use of shaft systems to transmit torque from input sources (e.g. engines) to output devices (e.g. gearboxes) is well known in the art. Typically, design parameters of a shaft system require that the shaft system operates within a rotational frequency range known as an operating frequency range, defined by a lower operating frequency and an upper operating frequency.

When a shaft system operates at high rotational frequencies, the shaft system passes through progressively higher rotational frequency ranges known as critical frequencies. At these critical frequencies, the physical properties of the shaft system and the rotational frequency of the shaft are such that a predominant vibration response occurs at a resonance frequency of the system. The resonance frequency is defined as a frequency at which the vibration response is at a maximum. The critical frequencies are referred to in order of their appearance, i.e., first order critical frequency, second order critical frequency.

Although many shaft systems contain features that may distinguish their critical frequencies from that of other shaft systems, the following general equation may be used to ascertain a critical frequency for a shaft that is simply supported at each end and has a constant cross-sectional area:

$$F_{crit} = C\sqrt{\frac{gEI}{wL^4}}$$

wherein;
- C=constant (1.57 for the first order critical frequency, 6.28 for the second order critical frequency)
- g=gravitational acceleration;
- E=modulus of elasticity;
- I=cross-sectional moment of inertia;
- w=weight per unit length of the shaft; and
- L=length of the shaft.

When a shaft system operates at or near a critical frequency, the shaft assumes a deflected shape known as a mode shape. The mode shape reflects lateral deflections of the shaft relative to the shaft's axis of rotation. A node in the mode shape is a location at which no deflections occur.

FIG. 1 depicts a typical shaft system comprising a shaft S supported at both ends thereof by bearings R, driven by an input I and connected to an output O. As depicted in FIG. 1, since the shaft S is not supported intermediate of its ends, the first order critical frequency of the shaft S is characterized by the shaft S assuming a sinusoidal mode shape approximating a half sine wave. When the shaft S assumes this mode shape, the shaft rotation becomes unstable and excessive vibration may occur. This vibration may damage elements of the shaft system, including the bearings, bearing support structures, and the shaft itself. When the rotation of the shaft S is increased beyond the first order critical frequency, the vibration subsides and the shaft S assumes a smoother rotation.

The shaft S will exhibit this smooth rotation until the frequency of the shaft reaches the second order critical frequency. As depicted in FIG. 2, the second order critical frequency is characterized by the shaft S assuming a sinusoidal mode shape approximating a full sine wave. When the shaft S assumes this mode shape, a second order critical frequency node N is defined substantially near the longitudinal center of the shaft S. When the shaft S assumes the second order critical frequency mode shape, the shaft rotation once again becomes unstable and may result in excessive vibration.

In a typical shaft system, the second order critical frequency occurs at a rotational frequency higher than the upper operating frequency such that the operation of the shaft system is not affected. By contrast, it is common in many shaft systems for the first order critical frequency to occur within the operating frequency range, thereby introducing the potential for shaft instability and the undesirable vibratory characteristics characterized above. Since the location of the first order critical frequency within the operating frequency range is undesirable, the prior art discloses a number of techniques for raising the first order critical frequency to a point beyond the operating frequency range.

Referring to the equation above for defining a critical frequency of a shaft system, it will be appreciated that since the cross-sectional moment of interia (I) is a function of the diameter of the shaft, it follows that the first order critical frequency is proportional to the diameter of the shaft. Therefore, if the diameter of a shaft is increased, the first order critical frequency will proportionally increase as well. However, increasing the diameter of the shaft also increases the weight of the shaft, and may make the shaft more expensive to manufacture. These weight and cost increases may not be acceptable, nor feasible, depending on the application for the shaft system.

It will also be appreciated that the first order critical frequency is inversely proportional to the square of the length of the shaft. Therefore, for example, decreasing the shaft length by ½ results in a 4× increase in the first order critical frequency. Two primary methods have been used in the prior art to decrease the length of a shaft.

The first method comprises using coupling or bearing assemblies to linearly link a plurality of short shafts together, in series, along a common axis of rotation. The disadvantages of this method are that it adds weight and expense to the shaft system, and may require increased maintenance to maintain the couplings and bearings in good working order.

The second method comprises using a long shaft with multiple bearing assemblies disposed along the length of the shaft such that the bearings prevent lateral displacement of the shaft at those points. The effect of this method is that the shaft behaves as if it was a plurality of shorter shafts linked linearly together. The disadvantages of this method are similar to those above, in that the plurality of bearings adds weight and cost to the assembly, and may necessitate increased maintenance to maintain the bearings in good working order.

U.S. Pat. No. 4,217,766 to Suckow discloses another method for increasing the first order critical frequency. In Suckow, an axial collar is placed substantially coaxial with a shaft and is fixed with respect thereto for rubbing contact with the shaft when the shaft deflects a predetermined amount from its rotational axis. The rubbing contact alters the bending mode of the shaft, thereby increasing the first order critical frequency to a level above a maximum frequency for the shaft. A disadvantage of this method is that the rubbing between the shaft and the collar necessitates deflection of the shaft as a condition precedent for vibration control within the operating frequency range.

DISCLOSURE OF THE INVENTION

It is therefore an object of the present invention to provide a method and apparatus for controlling lateral vibration in a shaft system by shifting a first order critical frequency of a rotating shaft out of an operating frequency range of the shaft system, without changing the second order critical frequency, wherein the shaft is a single shaft of unitary construction, and wherein deformation of the shaft is not a condition precedent for lateral vibration control within the operating frequency range.

Another object of the present invention is to provide a method and apparatus for controlling lateral vibration in a shaft system, wherein the shaft system utilizes a minimal number of bearings.

Still another object of the present invention is to provide a method and apparatus for controlling lateral vibration in a shaft system having a shaft of conventional diameter.

These and other objects are achieved in the present invention by a method for controlling lateral vibration in a rotating shaft, wherein the rotating shaft has a length, cross-sectional moment of inertia, modulus of elasticity, and unit length weight, a first order critical frequency, a second order critical frequency node spaced proximal to a longitudinal center of the rotating shaft, and an operating frequency range defined by a lower operating frequency and an upper operating frequency. The method comprising the steps of:

defining an adjusted first order critical frequency for the rotating shaft, the adjusted first order critical frequency being equal to or less than the lower operating frequency; and disposing a mass having a predetermined weight in combination with the rotating shaft at the second order critical frequency node, whereby the mass maintains the adjusted first order critical frequency equal to or less than the lower operating frequency, thereby controlling lateral vibration of the rotating shaft as the rotating shaft rotates within the operating frequency range.

The present invention also provides a shaft assembly for carrying out the method for controlling lateral vibration in a rotating shaft, the assembly comprising a shaft rotatably supported at ends thereof by supports, the shaft having a length, cross-sectional moment of inertia, modulus of elasticity, and unit length weight, the shaft being driven by an input source about an axis of rotation, the shaft having a first order critical frequency, a second order critical frequency node spaced proximal to a center of the shaft, and an operating frequency range defined by a lower operating frequency and an upper operating frequency.

The improvement in the shaft assembly comprising a mass disposed in combination with the shaft at the second order critical frequency node, the mass having a predetermined weight equal to or greater than a critical weight, the critical weight corresponding to a state wherein the first order critical frequency substantially equals the lower operating frequency, whereby the disposition of the mass about the shaft maintains the first order critical frequency at a frequency equal to or less than the lower operating frequency, thereby controlling lateral vibration of the shaft as the shaft rotates within the operating frequency range.

Still other objects and advantages of the present invention will become readily apparent to those skilled in this art from the following detailed description, wherein preferred embodiments of the invention are shown and described, simply by way of illustration of the best mode contemplated of carrying out the invention. As will be realized, the invention is capable of modifications in various respects, all without departing from the invention. Accordingly, the drawings and description are to be regarded as illustrative in nature, and not as restrictive.

BEST MODE FOR CARRYING OUT THE INVENTION

Figure 1:
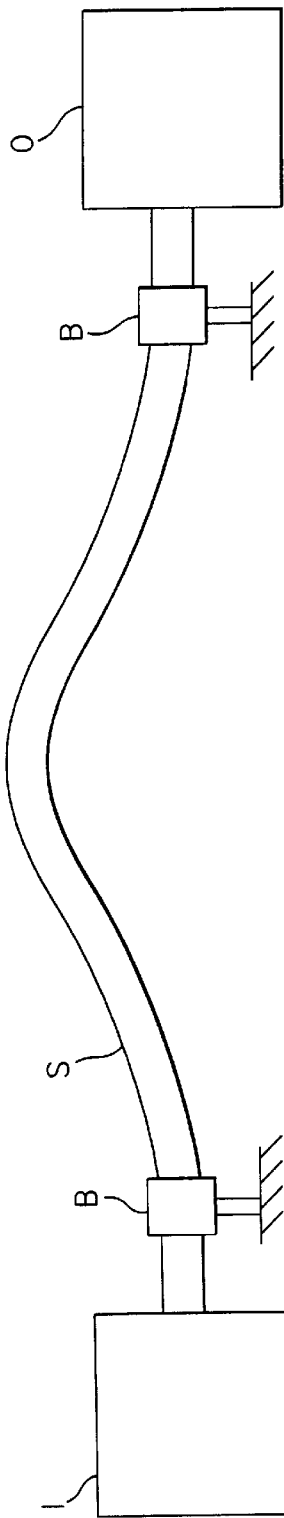
FIG. 1 is a side view of a prior art shaft assembly depicting a first order critical speed mode shape, wherein deformation of the shaft has been exaggerated for illustrative purposes.
Figure 2:
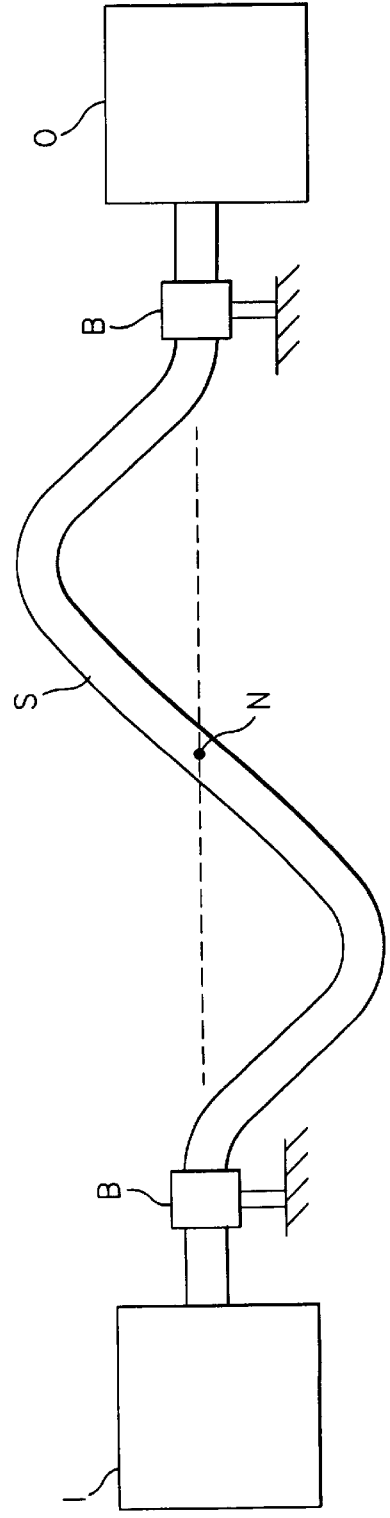
FIG. 2 is a side view of a prior art shaft assembly depicting a second order critical speed mode shape, wherein deformation of the shaft has been exaggerated for illustrative purposes.
Figure 3:
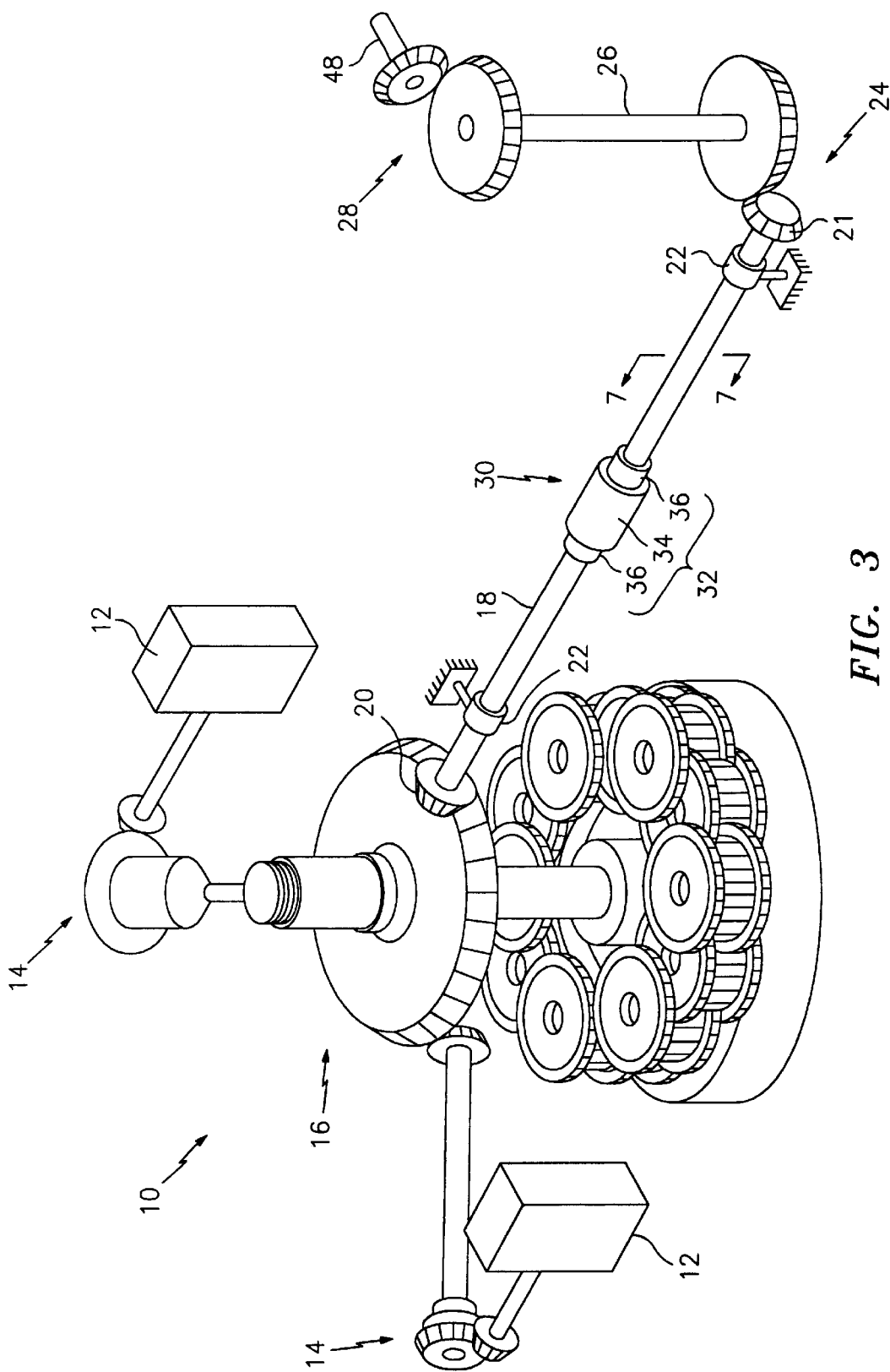
FIG. 3 is a perspective view of a shaft system embodying features of the present invention.

Referring to FIG. 3, a helicopter transmission system powertrain 10, exemplary of a shaft system capable of embodying the present invention, is illustrated. A set of augmented power packages 12 supply torque to corresponding input modules 14, which in turn drive main transmission assembly 16 into rotational movement. A tail rotor drive shaft 18 having gears 20, 21 disposed at both ends thereof, and rotatably supported proximal to both ends thereof by bearings 22, transfers torque from the main transmission assembly 16 to an intermediate gearbox 24. A secondary tail rotor pylon shaft 26 transfers torque from the intermediate gearbox 24 to a tail gearbox 28 which, in turn, transfers torque to a tertiary tail rotor shaft 48, which is connected to a tail rotor (not shown). In operation, main transmission assembly 16, gearboxes 24, 28, and tail rotor shafts 18, 26, 48 work in combination to transmit torque from the input modules 14 to the tail rotor.

It will be appreciated that the tail rotor drive shaft 18 is restrained from lateral movement at both ends thereof by the bearings 22. Since the tail rotor drive shaft 18 is not supported intermediate of the bearings 22, the tail rotor drive shaft 18 has a second order critical frequency node 30 located substantially near the longitudinal center of the tail rotor drive shaft 18.

A mass 32 having a predetermined weight W is disposed in combination with the tail rotor drive shaft 18 substantially at the second order critical frequency node 30. A method for predetermining the weight of the mass 32 will be discussed in greater detail below, wherein it will be shown that the weight of the mass 32 is predetermined such that a first order critical frequency of the tail rotor drive shaft 18 is shifted down to a frequency below an operating frequency range for the tail rotor drive shaft 18, and wherein the second order critical frequency remains unaltered.

The method for predetermining the weight of the mass 32 will now be discussed in greater detail, by way of example for the tail rotor drive shaft in a Sikorsky® S-92™ helicopter. (Sikorsky is a registered trademark of the Sikorsky Aircraft Corporation; S-92™ is a trademark of the Sikorsky Aircraft Corporation.)

The tail rotor drive shaft 18 for the S-92 helicopter is designed to rotate within an operating frequency range defined by a lower operating frequency of 1250 rpm and an upper operating frequency of 4500 rpm. Since it is not desirable for the critical frequencies for the tail rotor drive shaft 18 to occur within the operating frequency range, it is necessary to ascertain the rotational frequencies at which the critical frequencies for the tail rotor drive shaft 18 occur and compare those frequencies with the operating frequency range.

If the tail rotor drive shaft 18 is assumed to be a simply supported shaft having a constant cross-section, then the critical frequencies for the tail rotor drive shaft 18 without the mass 32 can be calculated using the following equation of general applicability:

$$F_{crit} = C \sqrt{\frac{gEI}{wL^4}} \quad (1)$$

wherein;

$C$ = constant
(1.57 for the first order critical frequency, 6.28 for the second order critical frequency)

$g$ = gravitation acceleration $\approx 9.81$ m/s$^2$
= 386 in/sec$^2$ $E$ = modulus of elasticity $\approx 7.24 * 10^3$ MPa
= 10.5 * 10$^5$ lb/in$^2$ $I'$ = cross-sectional moment of inertia $\approx 82.6$ cm$^4$
= 1.984 in$^4$ $w$ = weight per unit length of the shaft $\approx 0.22$ N/cm
= 1.26 lb/in $L$ = length of the shaft $\approx 262.64$ cm
= 103.4 in A more precise calculation of the critical frequencies may be conducted using a finite element based shaft dynamics computer program. The input variables for this program include, but are not limited to, the following: shaft modulus of elasticity, shaft cross-sectional moment of inertia, shaft weight, shaft length, rotational frequency, imbalances, gyroscopic effects, viscous and material damping, and asymmetric support conditions.

Upon comparison of the critical frequencies and the operating frequency range, if it is determined that the first order critical frequency of the tail rotor drive shaft 18 occurs within the operating frequency range, then an adjusted first order critical frequency $F_{adj}$ should be selected such that the adjusted first order critical frequency $F_{adj}$ is equal to or less than the lower operating frequency. In order to shift the first order critical frequency to the selected adjusted first order critical frequency $F_{adj}$, the mass 32 of predetermined weight W is disposed in combination with the tail rotor drive shaft 18 at the second order critical frequency node 30, such that the mass 32 alters the physical characteristics of the tail rotor drive shaft 18, and thereby alters the tail rotor drive shaft's vibratory response.

The relationship between the first order critical frequency and the mass 32 may be characterized by the following critical frequency equation of general applicability for a simply supported shaft having a constant cross-section, with no weight of its own, supporting a mass having a predetermined weight W, and defined by:

$$F_{wt} = \frac{1}{2\pi} \sqrt{\frac{48gEI}{WL^3}} \quad (2)$$

It will be appreciated from Equation 2 that the first order critical frequency $F_{wt}$ is inversely proportional to the square-root of the predetermined weight W. Therefore, an increase in the predetermined weight W decreases the first order critical frequency $F_{wt}$.

Combining Equations 1 and 2, an adjusted first order critical frequency $F_{adj}$ may be calculated for the tail rotor drive shaft 18 in combination with the mass 32 using the following equation of general applicability:

$$F_{adj} = \sqrt{\frac{1}{\left(\frac{1}{F_{crit}^2} + \frac{1}{F_{wt}^2}\right)}} \quad (3)$$

However, it is preferable in this method for the predetermined weight W of the mass 32 to be a function of the adjusted first order critical frequency $F_{adj}$, therefore Equations 1, 2, and 3 may be combined and solved for the predetermined weight W such that the predetermined weight W is defined by:

$$W = \frac{48gEI\left(\frac{1}{F_{adj}^2} - \frac{wL^4}{(2.465)gEI}\right)}{4\pi^2 L^3} \quad (4)$$

Therefore, the predetermined weight W of the mass 32 is "predetermined" to the extent that the predetermined weight W of the mass 32 is a function of the adjusted first order critical frequency $F_{adj}$, which is defined in the first step of the method of the present invention. Once the adjusted first order critical frequency $F_{adj}$ is defined for the tail rotor drive shaft 18, Equation 4 determines a predetermined weight W for the mass 32 that is predetermined for the selected adjusted first order critical frequency $F_{adj}$.

It will be appreciated that the second order critical frequency is similar to the first order critical frequency in that generally the disposition of a mass in combination with the tail rotor drive shaft 18 would also decrease the second order critical frequency. However, since it is not desirable for the second order critical frequency to decrease such that it occurs within the operating frequency range OFR, the present invention provides for placement of the mass 32 at the second order critical frequency node 30. By disposing the mass 32 in combination with the tail rotor drive shaft 18 specifically at the second order critical frequency node 30, the second order critical frequency remains substantially unaltered despite a decrease in the first order critical frequency. This is due to the fact that, by definition, a node in the mode shape defines a location where no displacement occurs. It follows that if there is no displacement at such a node, then there will not be any lateral vibration at that location, and therefore, the disposition of the mass 32 at that location would have no effect on the second order critical frequency.

Figure 4:
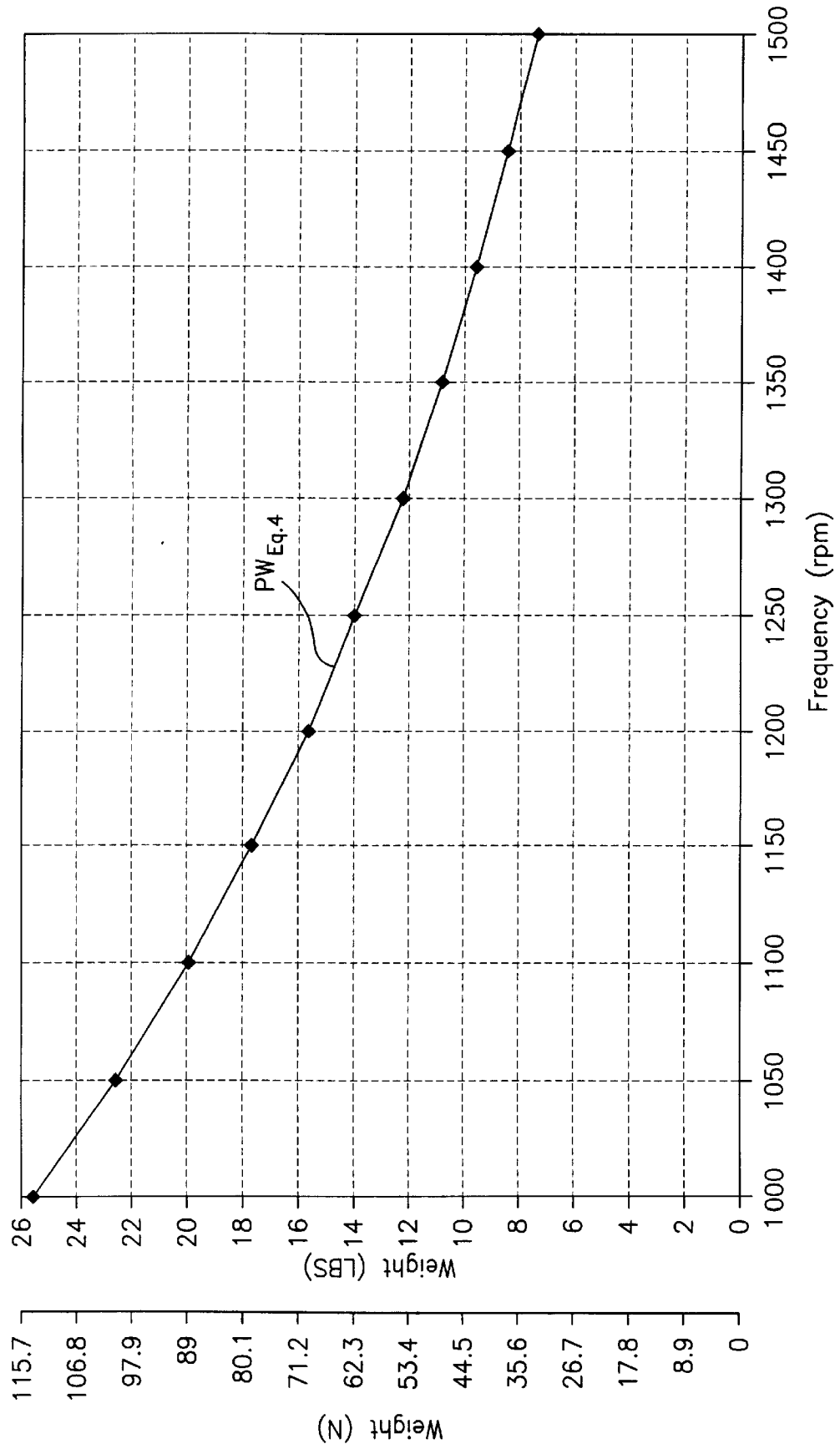
FIG. 4 is a graphical representation of predetermined weight v. adjusted first order critical frequency as defined by Equation 4.

FIG. 4 further illustrates the relationship between the adjusted first order critical frequency $F_{adj}$ and the predetermined weight W, as defined in Equation 4. As depicted in the graph of FIG. 4, a predetermined weight curve $PW_{Eq.4}$ decreases from a predetermined weight W value of approximately 115.65 N (26 lbs) to a value of approximately 35.6 N (8 lbs) along the y-axis as the adjusted first order critical frequency $F_{adj}$ increases along the x-axis from approximately 1000 r.p.m. to approximately 1500 r.p.m.

As with the finite element method for determining the critical frequencies, a more precise calculation of the predetermined weight W for the mass 32 may be conducted using a finite element based shaft dynamics computer program. The input variables for this program include, but are not limited to, the following: shaft modulus of elasticity, shaft cross-sectional moment of inertia, shaft weight, shaft length, rotational frequency, imbalances, gyroscopic effects, viscous and material damping, and asymmetric support conditions.

Figure 5:
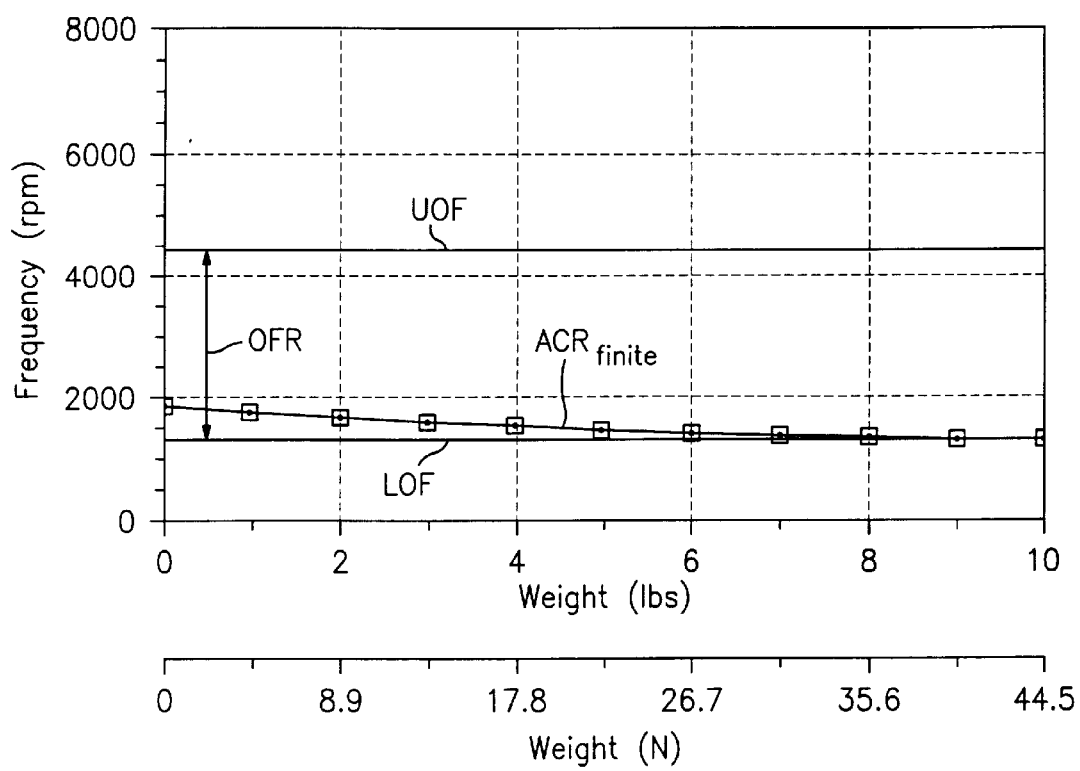
FIG. 5 is a graphical representation of predetermined weight v. adjusted first order critical frequency as defined by a finite elements calculation.

FIG. 5 depicts a graph of the adjusted first order critical frequency $F_{adj}$ versus the predetermined weight W for the S-92 helicopter tail rotor drive shaft 18, using the more precise finite element based shaft dynamics computer program. FIG. 5 depicts an adjusted first order critical frequency curve $ACF_{finite}$ that decreases from an adjusted first order critical frequency $F_{adj}$ value of approximately 2000 r.p.m. to a value of approximately 1000 r.p.m. as the predetermined weight W of the mass 32 increases from approximately 0 N (0 lbs) to approximately 44.482 N (10 lbs). In addition, FIG. 5 also depicts the relationship between the operating frequency range OFR and the adjusted first order critical frequency curve $ACF_{finite}$, whereby the operating frequency range OFR for the S-92 helicopter comprises a lower operating frequency LOF of approximately 1250 r.p.m., and an upper operating frequency UOF of approximately 4500 r.p.m.

Referring to FIG. 5, as the predetermined weight W decreases to a value of approximately 0 N (0 lbs) (which corresponds to the tail rotor drive shaft 18 without the mass 32), the adjusted first order critical frequency $F_{adj}$ approaches approximately 2000 r.p.m., which lies within the operating frequency range OFR. Therefore, according to the method of the present invention, the adjusted first order critical frequency $F_{adj}$ should be selected such that it is equal to, or less than, the lower operating frequency LOF for the S-92 helicopter. From an examination of the graph of FIG. 5, it will be understood that if the adjusted first order critical frequency $F_{adj}$ is selected such that it coincides with the lower operating frequency LOF (i.e. 1250 r.p.m.), then the corresponding predetermined weight W for the mass 32 will be approximately 32.47 N (7.3 lbs).

It will be appreciated from a comparison of FIGS. 4 and 5 that the values corresponding to the predetermined weight curve $PW_{Eq.4}$ derived from Equation 4 do not necessarily equate with the values corresponding to the adjusted first order critical frequency curve $ACR_{finite}$ derived from the finite elements method. The differences between the curves $PW_{Eq.4}$, $ACR_{finite}$ may be attributed to an increase in the number of input variables that the finite element method provides. A comparison of the curves $PW_{Eq.4}$, $ACR_{finite}$ reveals that the predetermined weight W obtained from Equation 4 for the S-92 helicopter input parameters is, on average, 31.14 N (7 lbs) higher than the predetermined weight W obtained using the finite element method.

Therefore, to increase the precision of Equation 4, a predetermined weight adjustment constant k may be factored into Equation 4 such that the resulting predetermined weight W more closely approximates the finite element results depicted in FIG. 5. The resulting equation for defining the predetermined weight W is:

$$W = \frac{48gEI\left(\frac{1}{F_{adj}^2} - \frac{wL^4}{(2.465)gEI}\right)}{4\pi^2 L^3} - k \quad (5)$$

wherein for the specific characteristics of the S-92 helicopter, k is approximately 31.14 N (7 lbs).

Figure 6:
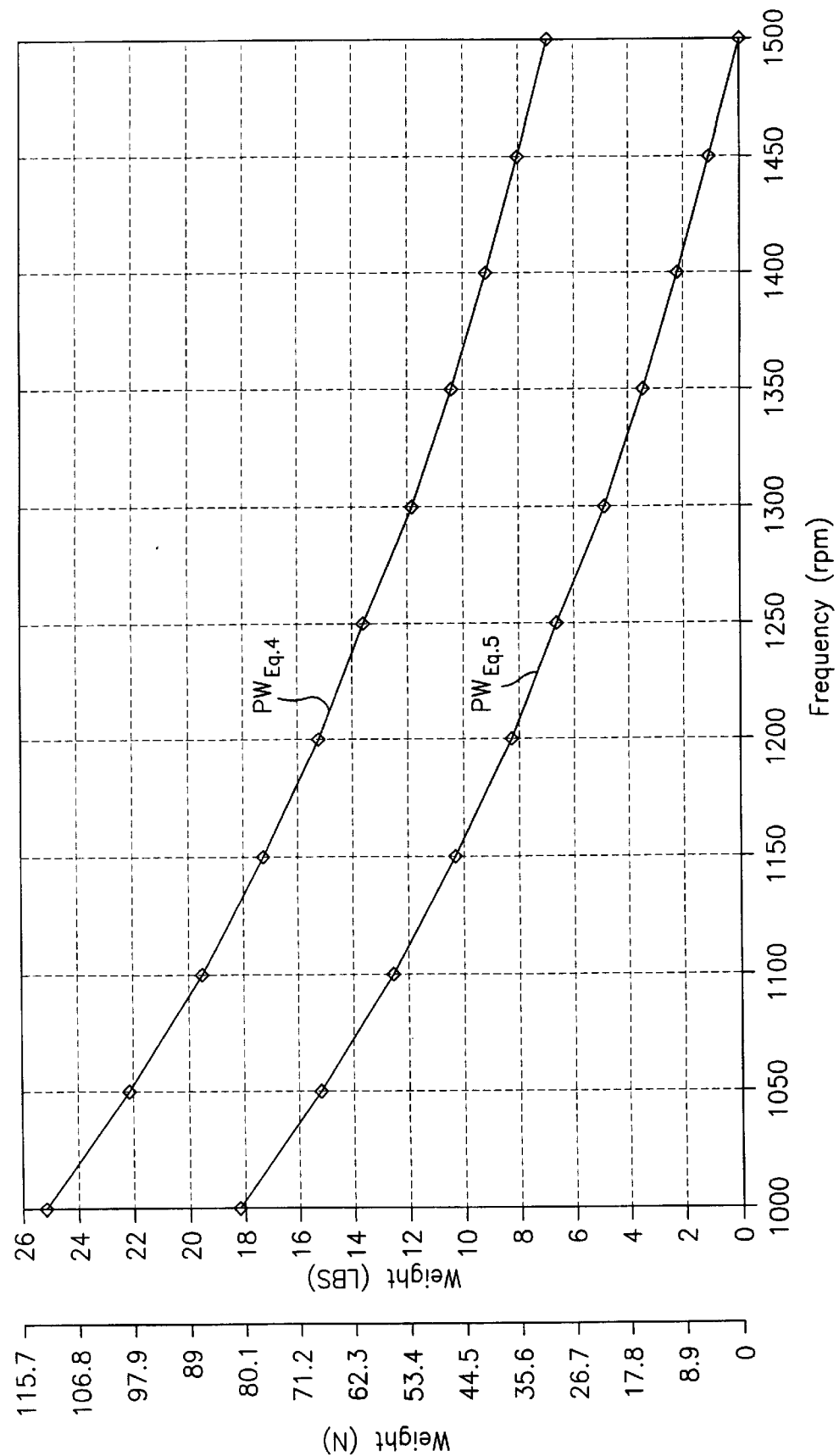
FIG. 6 is a graphical representation of predetermined weight v. adjusted first order critical frequency as defined by Equations 4 and 5.

A comparison of Equations 4 and 5 for the S-92 helicopter input parameters is depicted in the graph of FIG. 6, wherein the upper curve corresponds to the predetermined weight curve $PW_{Eq.4}$ from Equation 4 and the lower curve corresponds to a predetermined weight curve $PW_{Eq.5}$ from Equation 5. It will be appreciated that the predetermined weight curve $PW_{Eq.5}$ from Equation 5 more closely approximates the first order critical frequency curve $ACR_{finite}$ derived from the finite elements method than does the predetermined weight curve $PW_{Eq.4}$ from Equation 4. Therefore, it follows that Equation 5 more closely approximates the results obtained from the finite element method than does Equation 4.

Figure 7:
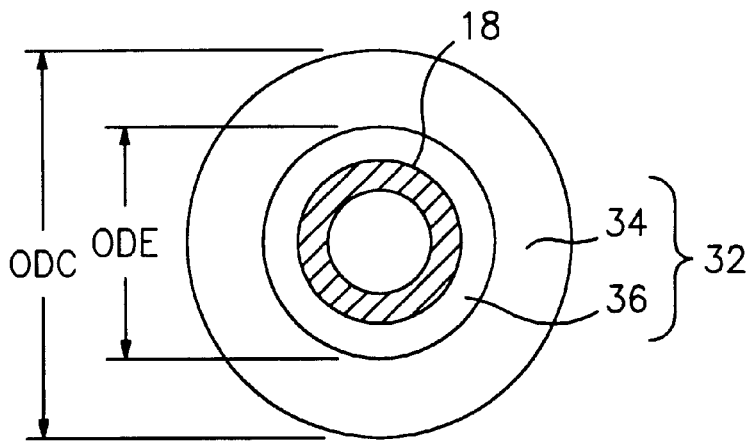
FIG. 7 is a cross-sectional view of the shaft and mass of FIG. 3, taken along the line 7—7 of FIG. 3.

Therefore, according to the method of the present invention, as depicted in FIGS. 3 and 7, and as exemplified by application of the method to an S-92 helicopter, a mass 32 having a predetermined weight W of 32.47 N (7.3 lbs) is disposed in combination with the tail rotor drive shaft 18 at the tail rotor drive shaft's second order critical frequency node 30.

In a preferred embodiment of the present invention, as depicted in FIGS. 3 and 7, the mass 32 is formed from stainless steel and comprises opposed edge portions 36 and a center portion 34 interposed between the edge portions 36. The mass 32 has a cylindrical cross-section wherein an outer diameter ODC of the center portion 34 of the mass 32 is greater than an outer diameter ODE of the edge portions 36 of the mass 32. In a preferred embodiment, the mass 32 is disposed in combination with the tail rotor drive shaft 18 by adhesively bonding the mass 32 onto the tail rotor drive shaft 18 using an adhesive of a type known in the art for bonding metals together.

In alternative embodiments, the mass 32 may be manufactured from alternative materials and may be formed into alternative shapes, provided however, that the size and shape of the mass do not introduce substantial rotational imbalances or other detrimental operational characteristics such as excessive system weight. Although in a preferred embodiment the mass 32 is adhesively bonded onto the tail rotor drive shaft 18, in alternative embodiments, the mass 32 may be welded or clamped onto the tail rotor drive shaft 18, or even formed with the tail rotor drive shaft 18 as a unitary whole.

Figure 8:
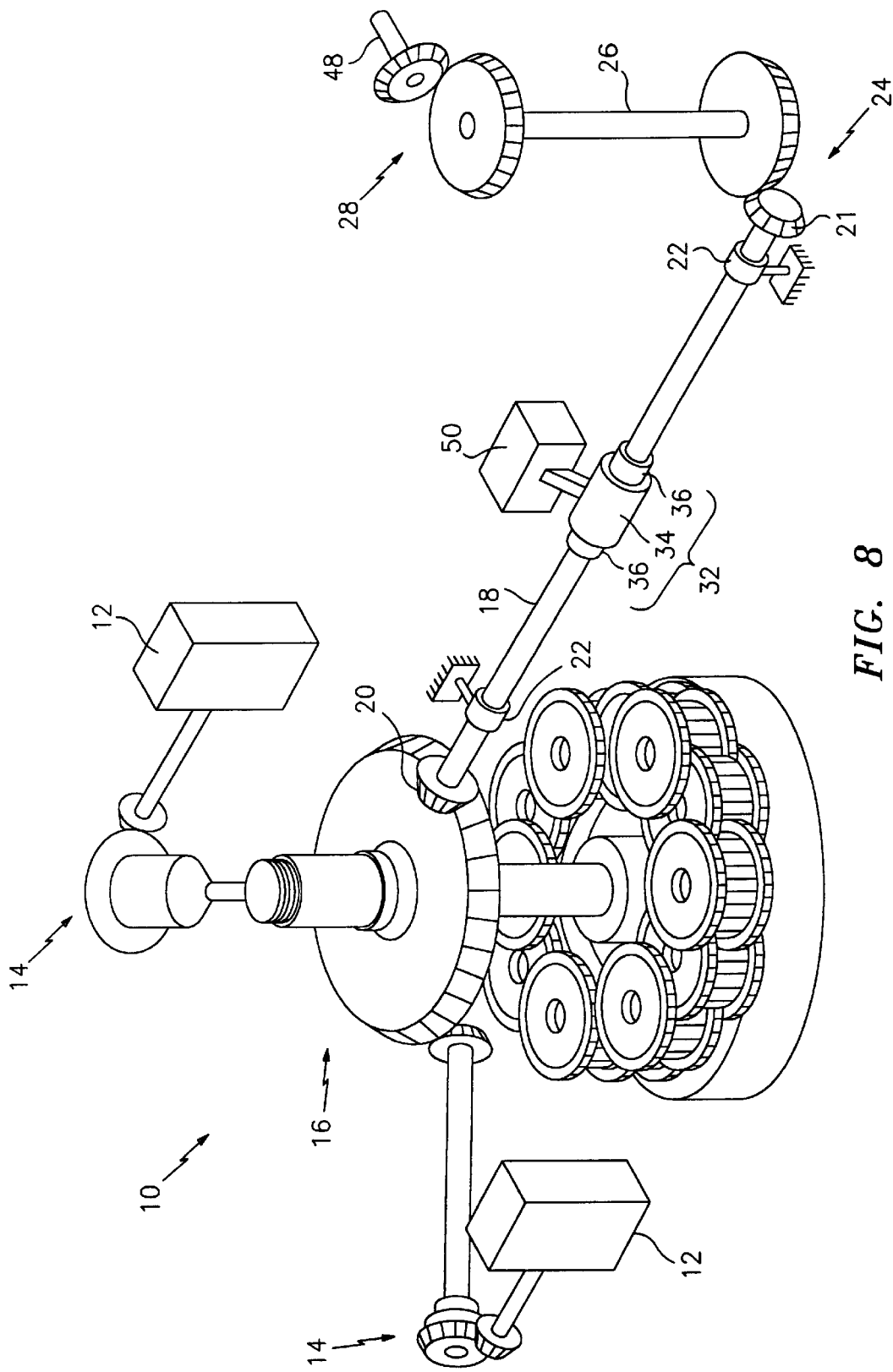
FIG. 8 is a perspective view of an alternative embodiment of the shaft assembly of FIG. 3, depicting a vibration limiting assembly disposed about the mass.

Referring once again to FIG. 5, it will be appreciated that although the adjusted first order critical frequency $F_{adj}$ should be defined such that it occurs below the operating frequency range OFR, it still becomes necessary for the rotational frequency of the tail rotor drive shaft 18 to pass through the adjusted first order critical frequency $F_{adj}$ during start-up and shut-down of the helicopter transmission system powertrain 10. As depicted in FIG. 8, to assist in the reduction of lateral vibration in the tail rotor drive shaft 18 as the rotational frequency of the tail rotor drive shaft 18 passes through the adjusted first order critical frequency $F_{adj}$, a vibration limiting assembly 50 is disposed in combination with the tail rotor drive shaft 18.

Figure 10:
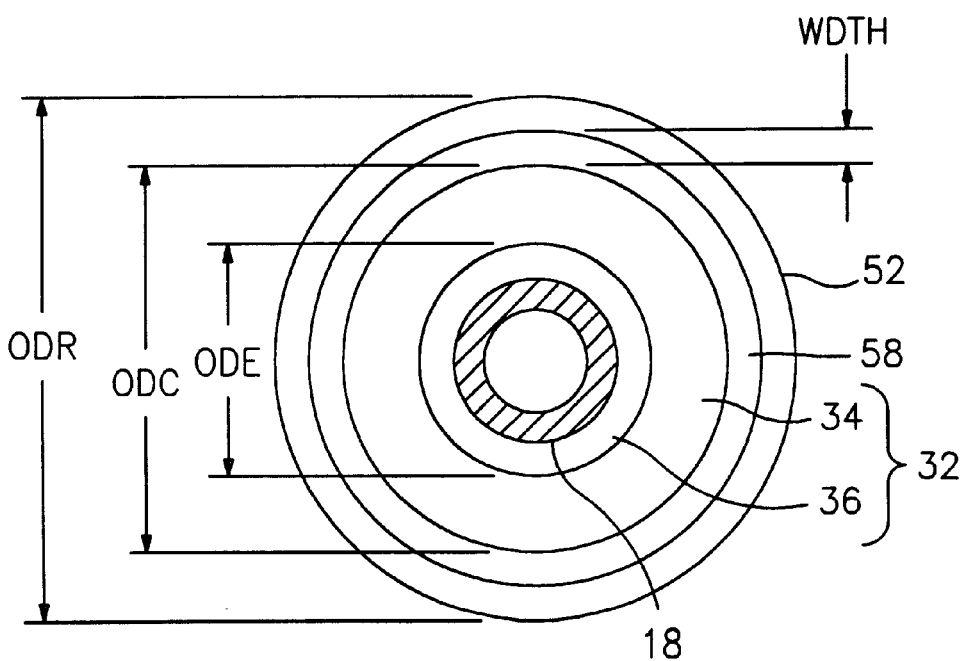
FIG. 10 is a cross-sectional view of the shaft, mass, and ring of FIG. 9, taken along the line 10—10 of FIG. 9.
Figure 9:
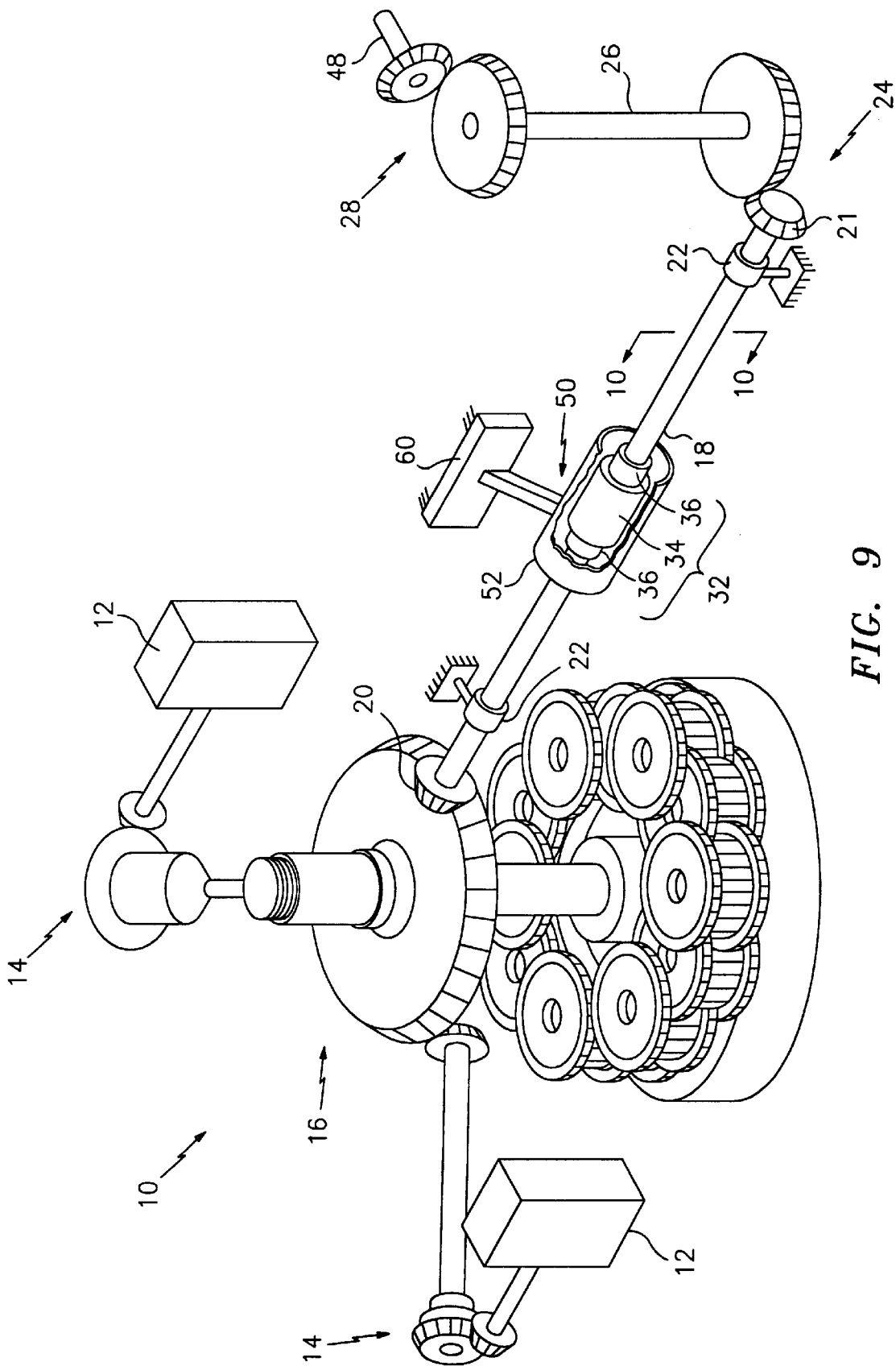
FIG. 9 is a perspective view, partly broken-away, of the shaft assembly of FIG. 8, depicting a preferred embodiment of the vibration limiting assembly comprising a ring disposed about the mass.

In a preferred embodiment of the present invention, as depicted in FIGS. 9 and 10, the vibration limiting assembly 50 comprises a ring 52 disposed concentrically about the mass 32, wherein the position of the ring 52 is maintained through a connection of the ring 52 to an adjacent static structure 60. The ring 52 has an outer diameter ODR greater than the outer diameter ODC of the center portion 34 of the mass 32, thereby forming an annular gap 58 therebetween (see FIG. 10). The width of the annular gap WDTH is defined such that as the rotational frequency of the tail rotor drive shaft 18 crosses through the adjusted first order critical frequency $F_{adj}$, and concurrently, as the tail rotor drive shaft 18 begins to assume its first order critical frequency mode shape, the center portion 34 of the mass 32 makes rubbing contact with the ring 52, thereby physically preventing deflection of the tail rotor drive shaft 18 beyond a predetermined level of deflection.

In a preferred embodiment, the ring 52 is formed from nylon and is rigidly connected to the static structure 60, wherein the static structure 60 further comprises structural members within the tail section of the S-92 helicopter. In alternative embodiments, the ring 52 may be formed from other material, or combinations of materials, including but not limited to, plastics, composites, metals, and ceramics. In addition, in alternative embodiments, the ring 52 may be fixedly or resiliently connected to the static structure 60, wherein the static structure 60 may comprise trusses, structural parts or members, or any other structure spaced proximal to the ring 52 and known in the art to be capable of handling loads of a magnitude necessary for supporting the ring 52 in this embodiment.

Figure 11:
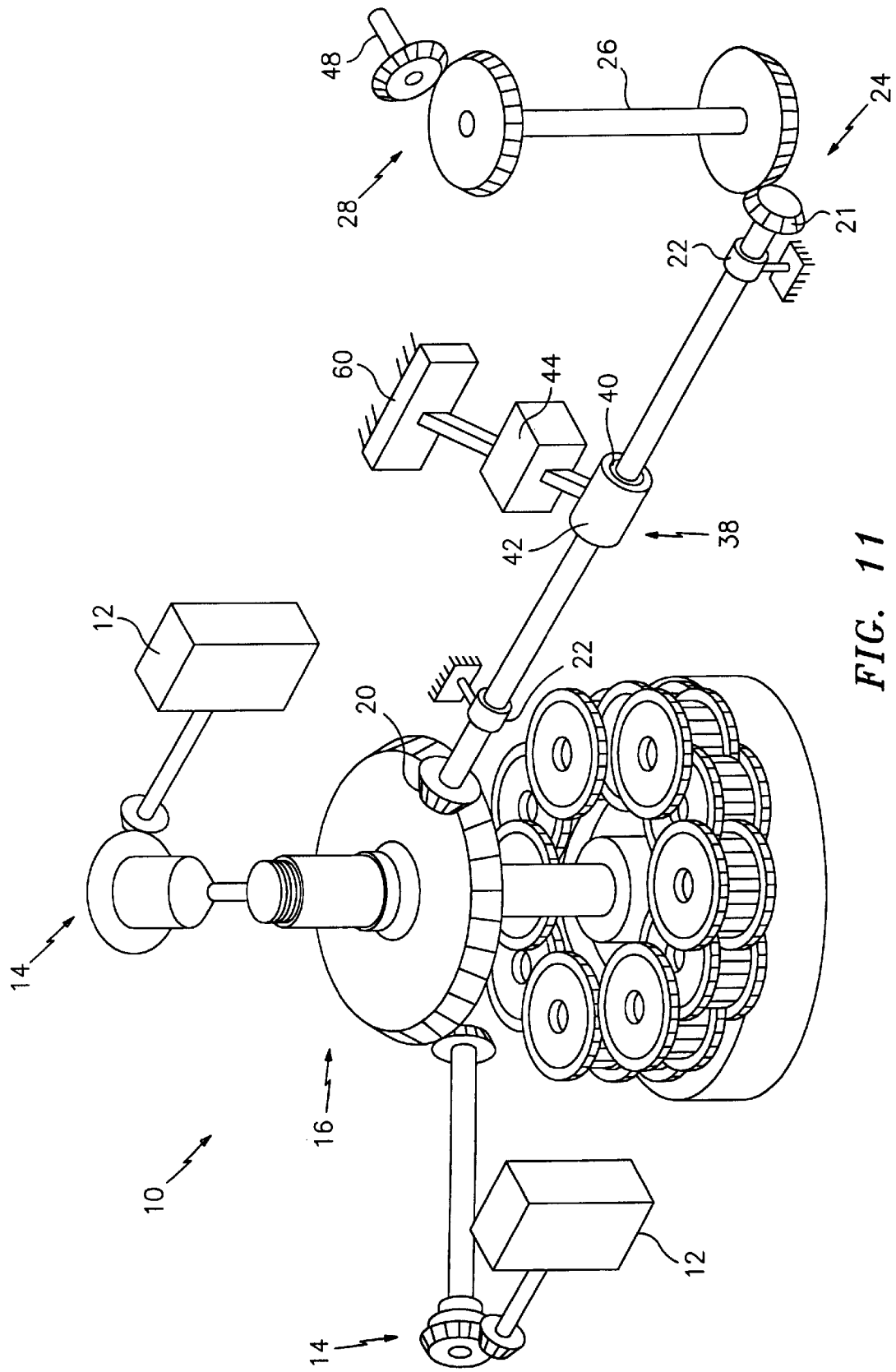
FIG. 11 is a perspective view of an alternative embodiment of the shaft assembly of FIG. 3, depicting the mass comprising a bearing assembly in combination with a damper and a static structure.

As depicted in FIG. 11, in yet another alternative embodiment, a bearing assembly 38 comprises the predetermined weight W. In this embodiment, the bearing assembly 38 also functions as the vibration limiting assembly, in that an inner race 40 of the bearing assembly 38 is connected to the tail rotor drive shaft 18, and an outer race 42 of the bearing assembly 38 is resiliently connected, using a damper 44, to the static structure 60. The static structure 60 may comprise trusses, structural parts or members, or any other structure spaced proximal to the bearing assembly 38 and known in the art to be capable of handling loads of a magnitude introduced through the resilient connection to the bearing assembly 38. The damper 44 may comprise, alone or in combination, resilient or elastomeric materials, springs, fluid-charged shocks or struts, or any other means known in the art for isolating vibration between a bearing and a structure.

Figure 12:
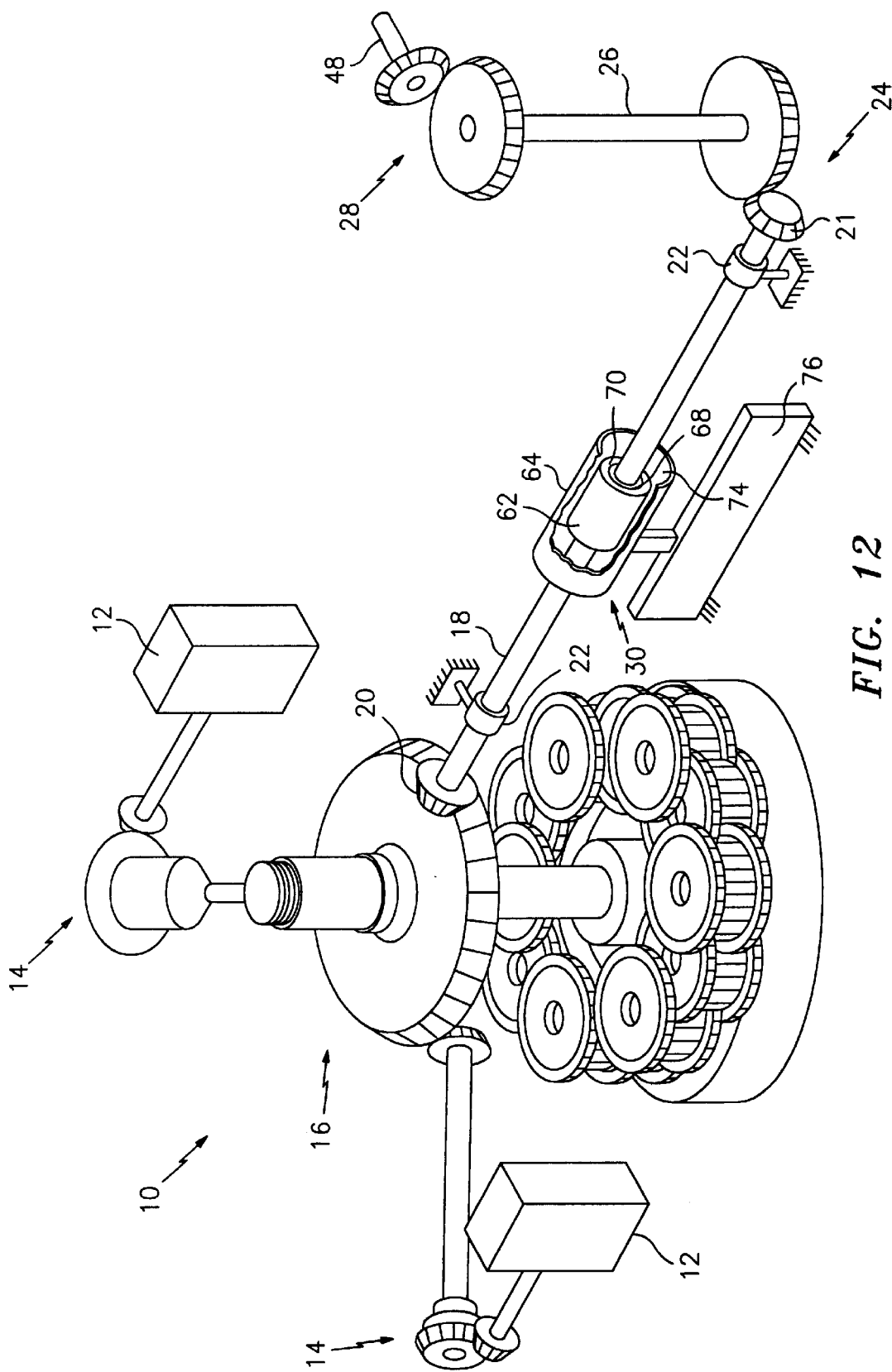
FIG. 12 is a perspective view, partly broken-away, of an alternative embodiment of the shaft assembly of FIG. 3, depicting the mass comprising a bearing assembly, wherein a ring is disposed about the bearing and is connected to a static structure.

In yet another embodiment of the present invention, as depicted in FIG. 12, the vibration isolation assembly comprises a bearing assembly 62 in combination with a ring 64. The bearing assembly 62, which functions as the predetermined weight W, has an inner race 68 and an outer race 70, and is disposed in combination with the tail rotor drive shaft 18 at the second order critical frequency node 30 such that the inner race 68 is fixed to the tail rotor drive shaft 18. An annular gap 74 is formed between the bearing assembly 62 and the ring 64, and is defined such that as the rotational frequency of the tail rotor drive shaft 18 crosses through the adjusted first order critical frequency $F_{adj}$, and concurrently, as the tail rotor drive shaft 18 begins to assume its first order critical frequency mode shape, the bearing assembly 62 makes contact with the ring 64. The contact between the bearing assembly 62 and the ring 64 physically prevents deflection of the tail rotor drive shaft 18 beyond a predetermined level of deflection. Upon contact between the bearing assembly 62 and the ring 64, the friction between the outer race 70 and the ring 64 causes the outer race 70 to rotate relative to the tail rotor drive shaft 18 as the bearing assembly 62 orbits about the ring 64. This relative rotational movement results in decreased frictional forces and shear stresses between the bearing assembly 62 and the ring 64.

In this embodiment, the ring 64 is formed from nylon and is rigidly connected to a static structure 76 (see FIG. 12) within the tail section of the S-92 helicopter. In alternative embodiments, the ring 64 may be formed from other material, or combinations of materials, including but not limited to, plastics, composites, metals, and ceramics. In addition, in alternative embodiments, the ring 64 may be fixedly or resiliently connected to the static structure 76, wherein the static structure 76 may comprise trusses, structural parts or members, or any other structure spaced proximal to the bearing assembly 62 and known in the art to be capable of handling loads of a magnitude necessary for supporting the ring 64 in this embodiment.

It will be readily seen by one of ordinary skill in the art that the present invention fulfills all the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. A method for controlling lateral vibration in a rotating shaft, said rotating shaft having a length (L), cross-sectional moment of inertia (I), modulus of elasticity (E), and unit length weight (w), said rotating shaft having a first order critical frequency, said rotating shaft having a second order critical frequency node spaced proximal to a longitudinal center of said rotating shaft, said rotating shaft having an operating frequency range defined by a lower operating frequency and an upper operating frequency, said method comprising the steps of:

defining an adjusted first order critical frequency ($F_{adj}$) for said rotating shaft, said adjusted first order critical frequency being equal to or less than said lower operating frequency; and disposing a mass having a predetermined weight (W) in combination with said rotating shaft at said second order critical frequency node, whereby said mass maintains said adjusted first order critical frequency at a frequency equal to or less than said lower operating frequency, thereby controlling lateral vibration of said rotating shaft as said rotating shaft rotates within said operating frequency range.

2. The method of claim 1, wherein said predetermined weight (W) is defined by $$\frac{48gEI\left(\frac{1}{F_{adj}^2} - \frac{wL^4}{(2.465)gEI}\right)}{4\pi^2 L^3} - k$$

wherein k is a predetermined weight adjustment constant.

3. The method of claim 2, wherein k equals 31.14 Newtons.

4. The method of claim 1, wherein said mass comprises a bearing assembly.

5. The method of claim 1, further comprising the step of:

disposing a lateral vibration limiting assembly in combination with said shaft, whereby said lateral vibration limiting assembly controls lateral vibration from said shaft upon said shaft passing through said first order critical frequency.

6. The method of claim 5, further comprising the step of disposing a structure proximal to said shaft; and wherein said lateral vibration limiting assembly comprises a ring disposed concentrically about said mass, said ring being connected to said structure and forming an annular gap between said mass and said ring, said annular gap having a predetermined width, whereby upon said shaft passing through said first order critical frequency and deforming to a first order critical frequency mode shape, said ring being disposed as to confine said mass to a predetermined displacement such that said shaft is restrained from further deflection.

7. In a shaft assembly having a shaft rotatably supported at ends thereof by supports, said shaft having a length (L), cross-sectional moment of inertia (I), modulus of elasticity (E), and unit length weight (w), said shaft being driven by an input about an axis of rotation, said shaft having a first order critical frequency, said shaft having a second order critical frequency node spaced proximal to a longitudinal center of said shaft, said shaft having an operating frequency range defined by a lower operating frequency ($F_{lower}$) and an upper operating frequency, the improvement comprising:

a mass disposed in combination with said shaft at said second order critical frequency node, said mass having a predetermined weight (W) equal to or greater than a critical weight, said critical weight corresponding to a state wherein said first order critical frequency substantially equals said lower operating frequency, whereby said disposition of said mass about said shaft maintains said first order critical frequency at a frequency equal to or less than said lower operating frequency, thereby controlling lateral vibration of said shaft as said shaft rotates within said operating frequency range.

8. The shaft assembly of claim 7, wherein said critical weight is defined by $$\frac{48gEI\left(\frac{1}{F_{lower}^2} - \frac{wL^4}{(2.465)gEI}\right)}{4\pi^2 L^3} - k$$

wherein k is a predetermined weight adjustment constant.

9. The shaft assembly of claim 8, wherein k equals 31.14 Newtons.

10. The shaft assembly of claim 7, wherein said mass comprises a bearing assembly.

11. The shaft assembly of claim 7, further comprising:

a lateral vibration limiter disposed in combination with said shaft, whereby said lateral vibration limiter controls lateral vibration from said shaft upon said shaft passing through said first order critical frequency.

12. The shaft assembly of claim 11, further comprising a structure disposed proximal to said shaft; and wherein said lateral vibration limiter comprises a ring disposed concentrically about said mass, said ring being connected to said structure and forming an annular gap between said mass and said ring, said annular gap having a predetermined width, whereby upon said shaft passing through said first order critical frequency and deforming to a first order critical frequency mode shape, said ring being disposed as to confine said mass to a predetermined displacement such that said shaft is restrained from further deflection.

* * * * *